United States Patent
Tetzner

[11] 3,713,243
[45] Jan. 30, 1973

[54] FISH HOOK REMOVER

[76] Inventor: Siegfried K. Tetzner, 5307 West Lake Shore Drive, Wonder Lake, Ill. 60097

[22] Filed: Jan. 27, 1971

[21] Appl. No.: 110,177

[52] U.S. Cl. ................................................43/53.5
[51] Int. Cl. ....................................A01k 97/00
[58] Field of Search........................................43/53.5

[56] References Cited

UNITED STATES PATENTS

| | | | |
|---|---|---|---|
| 3,377,735 | 4/1968 | Daughtry | 43/53.5 |
| 2,586,431 | 2/1952 | Krichbaum | 43/53.5 |
| 2,670,561 | 3/1954 | Howorth et al | 43/53.5 |
| 3,374,570 | 3/1968 | Lenzen | 43/53.5 |

*Primary Examiner*—Louis G. Mancene
*Assistant Examiner*—Daniel J. Leach
*Attorney*—Hofgren, Wegner, Allen, Stellman & McCord

[57] ABSTRACT

A tool for removing a barbed hook from a fish. The hook remover includes cam means for automatically positioning the barbed portion of the hook in a retracted protected position facilitating withdrawal of the tool and hook from the fish's mouth. The tool further includes improved means for manipulating the line attached to the hook during the removal operation.

11 Claims, 9 Drawing Figures

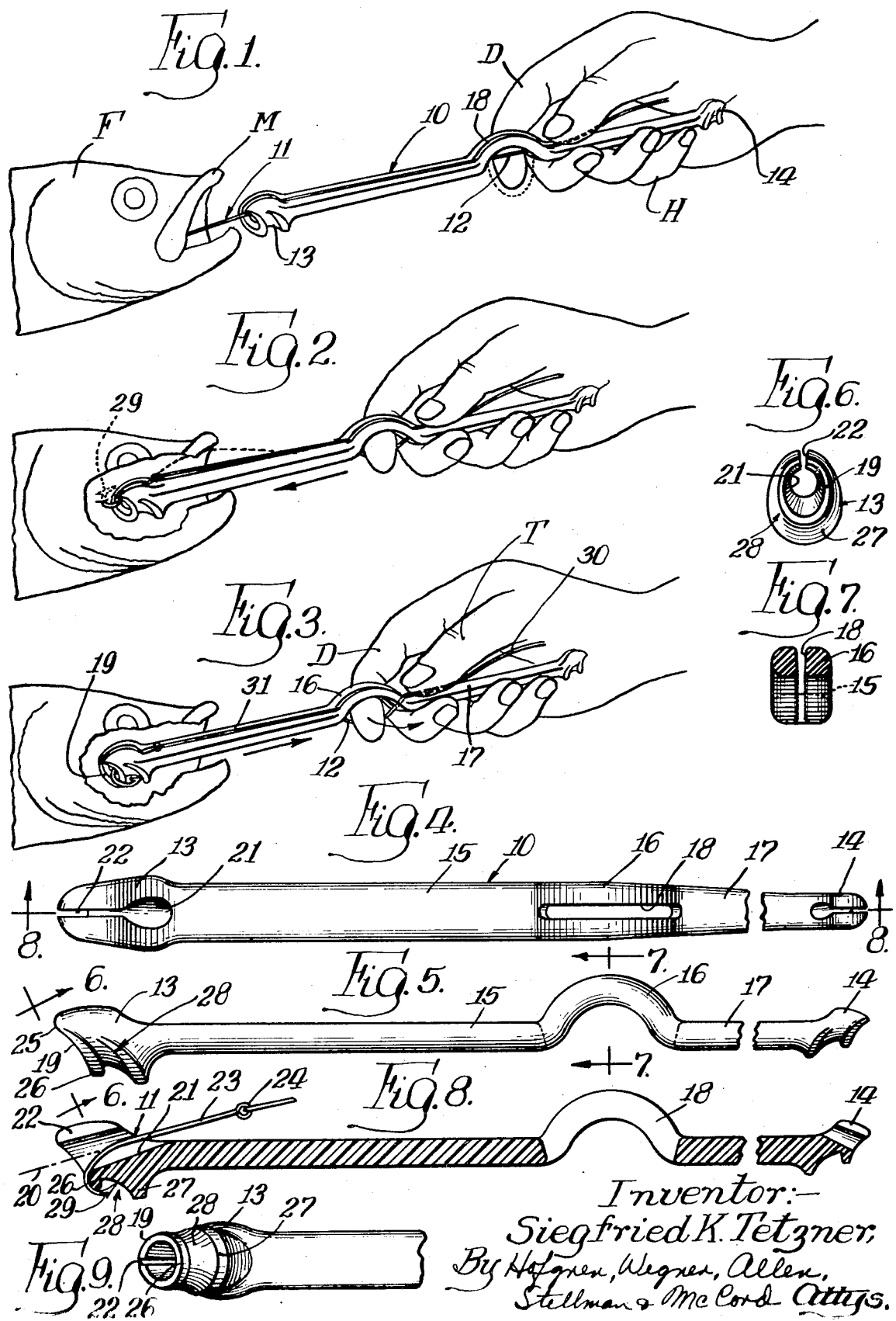

FISH HOOK REMOVER

BACKGROUND OF THE INVENTION

1. Field of the Invention

This invention relates to removal devices and in particular to devices for removing hooks embedded in fish.

2. Description of the Prior Art

A number of devices has been developed for removing a barbed hook from flesh in which it is embedded, such as fish hook removers for removing fish hooks from the mouth of a fish. The known devices have several disadvantages effectively limiting the usefulness thereof. In certain of the known fish hook removers, the end thereof required to be inserted in the fish's mouth is relatively large and may cause undesirable injury to the fish, such as where it is intended to remove the hook and return the fish back to the water as where the fish is undersized. Another disadvantage of the known fish hook removers is the inability thereof to effect automatic alignment of the operation portions thereof with the configuration of the embedded hook as a result of the inability of the user to ascertain the alignment of the hook bight embedded in the flesh of the fish. Such fish hook removers require substantial manipulation of the hook remover in an effort to position the removing means suitable relative to the hook arrangement and such manipulation with the remover in the fish's mouth may further cause substantial injury to the fish and is, at the best, relatively difficult.

Another problem of the known fish hook removers is the inability thereof to maintain the removed hook in a retracted position preventing rehooking thereof on portions of the fish's mouth as it is being withdrawn. This is due, in part, to the design of the hook removing portion at the end of the tool and in part to the inability of the user to maintain proper tautness in the line to retain the hook in the retracted position.

A still further disadvantage of the known hook removers is the inability thereof to accommodate the attachment means of different hooks as a result of the small size of the clearance passages provided therein.

SUMMARY OF THE INVENTION

The present invention comprehends an improved hook removing tool for facilitated removal of a barbed hook, such as a fish hook, from a fish's mouth. The tool includes means for camming the hook automatically to a retracted protected position facilitating withdrawal thereof without reengagement of the hook with the flesh of the fish's mouth during such withdrawal.

The tool of the present invention has a relatively small width permitting the use thereof without substantial injury to the fish notwithstanding the relatively small size of the fish's mouth and throat portions in which the hook may be embedded.

The invention comprehends an improved structure for protecting the tip of the hook during the retracting operation providing effectively positive prevention of reengagement of the hook with the fish's mouth while yet permitting such desirable effectively minimum cross-section of the tool.

The present fish hook remover further comprises means having a relatively large guide passage for passing conventional connecting means of fishing tackle so as to permit the use thereof with substantially all conventional tackle and hooks.

The fish hook remover of the present invention is extremely simple and economical of construction while yet providing the desirable features discussed above.

BRIEF DESCRIPTION OF THE DRAWING

Other features and advantages of the invention will be apparent from the following description taken in connection with the accompanying drawing wherein:

FIG. 1 is a perspective view of a fish hook remover embodying the invention as upon the initiation of a hook removing operation;

FIG. 2 is an isometric view similar to that of FIG. 1 but with portions of the fish's mouth broken away to illustrate the arrangement of the tool in a second step of the removing operation;

FIG. 3 is an isometric view similar to that of FIG. 1 but with portions of the fish's mouth broken away to illustrate the arrangement of the tool in a third step of the hook removing operation wherein the hook is being withdrawn from the fish's mouth;

FIG. 4 is a fragmentary top plan view of the fish hook remover;

FIG. 5 is a fragmentary side elevation thereof;

FIG. 6 is an end view taken substantially along the line 6—6 of FIG. 5;

FIG. 7 is a transverse section taken substantially along the line 7—7 of FIG. 5;

FIG. 8 is a fragmentary longitudinal section taken substantially along the line 8—8 of FIG. 4; and FIG. 9 is a fragmentary bottom plan view of one end of the fish hook remover.

DESCRIPTION OF THE PREFERRED EMBODIMENT

In the exemplary embodiment of the invention as disclosed in the drawing, a tool generally designated 10 for removing a barbed hook generally designated 11 from the mouth M of a fish F is shown to comprise a one-piece element adapted for manipulation with one hand H of a user, such as a fisherman. The tool is arranged to permit the user to insert a finger D against an exposed portion of the line 12 connected to the hook for manipulating the hook relative to the tool during the removal operation. The tool may include a fish hook extractor 13 at one end thereof and a second substantially identical but smaller hook extractor portion 14 at the opposite end thereof.

Tool 10 is extremely simple and economical of construction. The tool may be formed as a single molded plastic element for minimum cost. As best seen in FIGS. 4–9, the tool includes a first handle portion extending rearwardly from extractor portion 13 to an arcuate mid-portion 16 of the tool. A second handle portion 17 extends from extractor portion 14 to the arcuate portion 16. As seen in FIG. 4, arcuate portion 16 is provided with a longitudinal slot 18 adapted to accommodate longitudinally therethrough line 12 during the hook removing operation. Slot 18 extends from the top of arcuate portion 16 to the level of the top of handle portions 15 and 17, as seen in FIG. 8, whereby the line 12 may lie along the upper surface of the handle portion during the hook removing operation, as shown in FIGS. 1 and 3. The size of the arcuate portion 16 is preselected to permit the user's finger D to be inserted between the arcuate portion 16 and the line so as to permit the line to be drawn downwardly from arcuate portion 16 while being held against longitudinal displacement by the user's thumb T as shown in FIG. 3.

As indicated briefly above, each of the extractor portions 13 and 14 is identical except for size and, thus, the description thereof will be limited to portion 13, it being understood that the description may be applied equally to portion 14. As shown, extractor portion 13 defines a camming surface 19 at the distal end thereof comprising a substantially flat annular surface centered on an axis 20 of a passage 21 which is angularly related to the longitudinal extent of the tool, as shown in FIG. 8. The angle of axis 20 to the longitudinal extent of the tool is preferably a small angle, such as in the range of approximately 15° to 25°. Camming surface 19 extends obliquely to the longitudinal extent of the handle to have an upper forwardmost portion 25 and a lower rearwardmost portion 26. The extractor portion further defines a slot 22 through the upper portion thereof opening into passage 21, as best seen in FIG. 4. Slot 22 extends in the direction of the longitudinal extent of the handle and is preferably of relatively small width, such as approximately 0.03 inch, to accommodate the line 12 while effectively retaining the hook shank 23 and connecting means 24 in passage 21 during the removal operation.

The rearwardmost portion 26 of camming surface 19 of the extractor portion defines an arcuate lip, as shown in FIGS. 8 and 9. Rearwardly of arcuate lip 26, extractor portion 13 defines a second arcuate portion comprising a rib 27 for cooperatively defining a hook tip receiving space 28 therebetween, as shown in FIG. 8.

Lip 26 and rib 27 herein extend less than fully annularly about the extractor portion as the bight of hook 11 is caused to swing hook tip 29 downwardly into receiving space 28 during the removal operation. Thus, the enlargement of the extractor portion defined by lip 26 and rib 27 is maintained at minimum size for maintaining the extractor portion sufficiently small to avoid injury to the fish's mouth and throat notwithstanding the small size thereof. To permit such a limited extent of the receiving space, camming surface 19 is utilized to cam the hook to the position of FIG. 8 during the removal operation thereby to assure the disposition of the hook tip 29 in space 28 behind the protective rib 27 thereby effectively preventing reengagement of the hook tip 29 with portions of the fish's throat and mouth during the removal operation.

Illustratively, tool 10 may have an overall length of approximately 9 inches with the width of the extractor portion 13 being approximately five-eighths inch and the extractor portion 14 being approximately three-tenths inch. The diameter of passage 21 may be approximately one-fourth inch. The height of arcuate portion 16 from the level of the bottom of handle portions 15 and 17 may be approximately eleven-sixteenths inch. The arcuate portion 16 may be slightly off center relative to the handle portions such as being centered at 5 inches from the extractor portion 13 and 4 inches from the extractor portion 14 end. Slot 18 may have a width of approximately 0.09 inch for facilitated movement of the line 12 thereinto and therefrom in the hook removal operation. The hook remover may be formed of a suitable plastic for facilitated manufacture as by molding.

In use, the hook remover is arranged with the appropriate extractor portion adjacent the fish's mouth. Thus, for very small fish, the small extractor portion 14 is used whereas for larger fish, the extractor portion 13 may be used. Line 12 is passed through slot 18 and the tool is moved longitudinally into the fish's mouth M to cause abutment of the camming surface 19 with the flesh of the fish at the point of embedment of the hook, as shown in FIG. 2. At this time, the line 12 is allowed to remain somewhat loose.

The tool is then further advanced into the fish's mouth to urge the hook rearwardly thereby to disengage the barbed tip 29 from the flesh. Upon release of the barbed tip from the flesh, the user tautens the line 12 by moving his finger D downwardly against the line with the finger disposed under the arcuate portion 16 of the tool. At the same time, the remote portion 30 of the line is maintained against the tool handle portion 17 by application of the user's thumb T whereby the proximal portion 31 of the line is made taut thereby causing the hook to slide against camming surface 19 and be swung around by the resultant camming action to the retracted position of FIGS. 3 and 8 wherein barbed tip 29 is received in space 28. The camming action is automatically effected to swing the hook to this position by the simple application of tension in the line portion 31 upon release of the barbed tip from the flesh without turning or further manipulating of the tool.

With the line portion 31 thusly held taut, the barbed tip 29 remains protected behind rib 26 permitting the tool to be withdrawn without reengagement of the hook tip 29 with the flesh of the fish during the removal movement, as shown in FIG. 3.

Thus, the operation of tool 10 is effectively a one-hand operation permitting the user to hold the fish with the opposite hand for improved facilitated hook removal. By virtue of the effective minimizing of the width of the extractor portion, the tool removes the hook with minimum distention and injury to the fish's mouth and throat while yet assuring positive facilitate non-rehooking removal.

The use of extractor portion 14 with smaller hooks is identical to the use of extractor portion 13 with larger hooks as discussed above.

The foregoing disclosure of specific embodiments is illustrative of the broad inventive concepts comprehended by the invention.

I claim:

1. A tool for removing from a fish a barbed hook attached to the end of a line, said tool comprising: an elongated handle; and an extracting element at one end of the handle defining a distal annular camming surface extending obliquely to the longitudinal extent of the handle to have a forwardmost portion and a rearwardmost portion, a shoulder projecting transversely to the longitudinal extent of the handle spaced rearwardly of said rearwardmost portion of the camming surface, a radially outwardly opening recess in the extracting element intermediate said camming surface rearwardmost portion and said shoulder, and a slot extending through said camming surface in the direction of the longitudinal extent of the handle at a position spaced from said rearwardmost portion whereby sad tool may be longitudinally advanced along the line with said line passed through said slot to a position radially inwardly of said annular camming surface until the bight of said hook engages said camming surface and said bight is cammed along said camming surface to a retracted position at said rearwardmost portion of the camming surface as a result of tension force being applied to said line, the tip of said hook being received in said recess behind said projecting shoulder in said retracted position permitting withdrawal of said element with said hook held in said retracted position without reengagement with the tissue of the fish.

2. The fish hook removing tool of claim 1 wherein said slot position is at said forwardmost portion of the camming surface.

3. The fish hook removing tool of claim 1 wherein said element is generally tubular with the bore thereof extending obliquely to the longitudinal extent of said handle.

4. The fish hook removing tool of claim 1 wherein said shoulder is segmentally annular and extends from rearwardly of said rearwardmost portion toward rearwardly of said forwardmost portion of said camming surface.

5. The fish hook removing tool of claim 1 wherein the width of said element is substantially similar to the width of said handle.

6. The fish hook removing tool of claim 1 wherein a second extracting element is provided at the opposite end of said handle the size of said second extracting element being different from that of said first named extracting element.

7. A tool for removing from a fish a barbed hook attached to the end of a line, said tool comprising: an elongated handle; and an extracting element at one end of the handle defining a distal annular camming surface extending obliquely to the longitudinal extent of the handle to have a forwardmost portion and a rearwardmost portion, a shoulder projecting transversely to the longitudinal extent of the handle rearwardly of said rearwardmost portion of the camming surface, and a slot extending through said camming surface in the direction of the longitudinal extent of the handle at a position spaced from said rearwardmost portion whereby said tool may be longitudinally advanced along the line with said line passed through said slot to a position radially inwardly of said annular camming surface until the bight of said hook engages said camming surface and said bight is cammed along said camming surface to a retracted position at said rearwardmost portion of the camming surface as a result of tension force being applied to said line, the tip of said hook being received behind said projecting shoulder in said retracted position permitting withdrawal of said element with said hook held in said retracted position without reengagement with the tissue of the fish, said handle including an upstanding arcuate mid-portion having a longitudinal slot therethrough whereby the portion of a line extending along the handle and through said longitudinal slot extends chordally across the space defined by said arcuate mid-portion for providing facilitated fingertip manipulation of the line.

8. A tool for removing from a fish a barbed hook attached to the end of a line, said tool comprising:
   an elongated handle;
   an extracting element at one end of the handle; and
   means for providing facilitated fingertip manipulation of the line comprising an upstanding bridge mid-portion having a longitudinal slot therethrough whereby the portion of a line extending along the handle and through said longitudinal slot extends chordally across the space defined by said bridge mid-portion.

9. The fish hook removing tool of claim 8 wherein said handle defines a flat surface adjacent one end of said bridge mid-portion for clamping the line thereagainst by the user's thumb.

10. The fish hook removing tool of claim 8 wherein said bridge mid-portion is arcuate.

11. The fish hook removing tool of claim 8 wherein a second extracting element is provided at the opposite end of said handle the size of said second extracting element being different from that of said first named extracting element, and said handle defines a pair of flat surfaces disposed one each adjacent the opposite ends of said bridge mid-portion for clamping the line thereagainst by the user's thumb.

* * * * *